United States Patent
Pesquet-Popescu et al.

(10) Patent No.: US 6,850,570 B1
(45) Date of Patent: Feb. 1, 2005

(54) COLOR VIDEO ENCODING METHOD BASED ON A WAVELET DECOMPOSITION

(75) Inventors: Bétrice Pesquet-Popescu, Bourg-la-Reine (FR); Marion Bénetiére, Nogent-sur-Marne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 568 days.

(21) Appl. No.: 09/698,769

(22) Filed: Oct. 27, 2000

(30) Foreign Application Priority Data

Oct. 28, 1999 (EP) .......................................... 99402692

(51) Int. Cl.$^7$ .............................................. H04N 07/18
(52) U.S. Cl. .............................. 375/240.19; 375/240.18
(58) Field of Search ........................ 375/240.19, 240.18

(56) References Cited

U.S. PATENT DOCUMENTS 6,393,060 B1 * 5/2002 Jeong ..................... 375/240.19
6,466,698 B1 * 10/2002 Creusere .................... 382/132

FOREIGN PATENT DOCUMENTS

US 000983097 1/1998
US 000983032 1/1999

OTHER PUBLICATIONS

Beong–jo Kim Et Al, "An Embedded Wavelet Video Coder Using Three–Dimensional Set Partitioning in Hierarchical Trees" (SPIHT), Proceedings of Data Compression Conference, Snowbird, Utah, USA, 1997,pp. 251–257.

* cited by examiner

Primary Examiner—Andy Rao

(57) ABSTRACT

The invention relates to a color video coding method using the so-called 3D-SPIHT algorithm applied to the color space constituted by the luminance plane Y and the chrominance planes U and V in the 4:2:0 format. A wavelet decomposition of the U and V planes is performed over a number of resolution levels which is the number of resolution levels of the wavelet decomposition of the luminance plane minus one. The full resolution color U or V plane may be seen as an approximation of the full resolution luminance plane, and, the size of said full resolution color U or V plane being the same as the size of the first level approximation in the multiresolution decomposition of the Y plane, the n-th resolution level of the luminance has the same size as the (n−1)-th level of the chrominance. Each pixel (i,j) of the approximation sub-band at the lowest resolution of the Y plane is associated with the pixel at the same location in the corresponding sub-band of the U and V planes.

3 Claims, 3 Drawing Sheets

COLOR VIDEO ENCODING METHOD BASED ON A WAVELET DECOMPOSITION

FIELD OF THE INVENTION

The present invention relates to a color video coding method using the so-called 3D-SPIHT algorithm applied in a tri-stimulus color space such as YUV with luminance plane Y and chrominance planes U and V being in the 4:2:0 format. This invention applies to color video sequences, as well as to color images.

BACKGROUND OF THE INVENTION

One of the most effective video compression algorithms is based on a three-dimensional (2D+t) processing of the concerned video sequence: the redundancy in the video information is reduced by performing a separable 3D wavelet transform (the main difference with a predictive approach being the fact that the temporal axis is processed as the spatial ones). The efficiency of this approach is improved when a motion compensation of the group of frames (GOF) considered in the temporal filtering is applied previous to the filtering. Unlike the spatial decomposition, which can benefit from long filters, the best choice for temporal filtering turns out to be the so-called Haar multiresolution analysis, because it introduces no boundary problems and a minimal delay.

The 3D wavelet decomposition is therefore applied to each GOF in the sequence. The size of the group is chosen in order to trade-off the delay in reconstruction (important in real-time applications such as videoconference) and the efficiency of the subsequent coding algorithm. When a 3D-SPIHT algorithm such as described in "An embedded wavelet video coder using three-dimensional set partitioning in hierarchical trees (SPIHT)" by B. J. Kim and W. A. Pearlman, Proceedings of Data Compression Conference, Snowbird, Utah, USA, 1997, pp.251–257, is applied to the decomposed GOF, a sufficient number of decomposition levels must exist in order to construct the spatio-temporal trees on which the algorithm is based. In practice, a number of 16 frames in the GOF is a good choice for most sequences.

This 3D-SPIHT algorithm may be applied to grey video sequences, but the processing of color sequences raises the problem of embedding the color in the same bitstream. Considering a tri-stimulus color space such as YUV, with luminance Y and chrominance planes U and V in the 4:2:0 format, a simple method to cope with the coding problem of color video would be to code each color plane separately as it is done by a conventional color video coder. This technique however fails to provide an embedded bitstream, since it requires a bit-allocation strategy among color planes. Moreover, the color planes bitstreams are concatenated and the receiver has to wait until the entire bitstream arrives in order to reconstruct the video and to display it.

According to another solution, all color planes may be treated as one unit at the coding stage and one mixed bitstream may then be generated, so that one can stop at any point in the reconstruction and display the color video at the given bit-rate. This solution proceeds by separately performing a 3D wavelet decomposition with the same number of levels on each color plane. Then, to code all planes together, the LIP and LIS defined in SPIHT are initialized with the appropriate coordinates of the top level in all the three planes.

In the previously described approach, each color plane has its own spatio-temporal orientation tree, but the Y-, U-and V-trees are mutually exclusive. In the mean-time, when using the 4:2:0 format, the differences of sizes between Y-, U- and V-planes strongly impact the possibility of performing the same multiresolution analysis and also the coding efficiency of the subsequent SPIHT algorithm. Indeed, the problem which appears is that even if the original format of the video (CIF or QCIF) allows for a certain number of resolution levels when considering the luminance plane (for example, the QCIF format, 176×144 allows for 4 resolution levels), for the chrominance, which is already in a sub-sampled format, a level less must be done in the decomposition. On the other hand, as the SPIHT encoding only works well with subbands of even sizes, then only 3 levels are possible for the luminance plane. In what concerns the acceptable number of decomposition levels of the chrominance planes, two strategies are possible:

the same number of resolution levels is considered for the chrominance multiresolution analysis, which leads to odd-sized subbands at the lowest resolution level (therefore the original SPIHT algorithm cannot cope with this strategy without any adaptation); the appropriate number of decomposition levels is chosen for each color plane, such that the SPIHT algorithm applies directly.

SUMMARY OF THE INVENTION

It is the object of the invention to propose a simplified implementation of the second strategy.

To this end, this invention relates to a method such as defined in the introductory part of the description and according to which:

- a wavelet decomposition of the U and V planes is performed over a number of resolution levels which is the number of resolution levels of the wavelet decomposition of the luminance plane minus one;
- the U and V color planes being already in a sub-sampled format which allows to see the full resolution color U or V plane as an approximation of the full resolution luminance plane, the size of said full resolution color U or V plane is the same as the size of the first level approximation in the multiresolution decomposition of the Y plane and the n-th resolution level of the luminance has the same size as the (n−1)-th level of the chrominance;
- each pixel (i,j) of the approximation sub-band at the lowest resolution of the Y plane is associated with the pixel at the same location in the corresponding sub-band of the U and V planes.

BRIEF DESCRIPTION OF THE DRAWINGS

The present invention will now be described, by way of example, with reference to the accompanying drawings in which.

DETAILED DESCRIPTION OF THE INVENTION

The present invention exploits the fact that the U and V color planes in the 4:2:0 format are already in a subsampled format: the full resolution color U or V plane may then be seen as an approximation of the full resolution luminance plane. Moreover, its size is the same as the size of the first level approximation in the multiresolution decomposition of the Y-plane. When performing a wavelet decomposition over several resolution levels, the $n^{th}$ resolution level of the luminance has the same size as the $(n-1)^{th}$ level of the chrominance. This correspondance therefore allows to perform a wavelet decomposition of the U and V planes over a number of resolution levels which is the number of resolution levels of the wavelet decomposition of the luminance plane minus one.

Each pixel (i,j) of the approximation subband at the lowest resolution of the Y-plane is associated with the pixel at the same location in the corresponding subband of the U and V planes. It has been indeed experimentally verified the a priori assumption that the chrominance coefficients have smaller values than the luminance coefficient in the root subband. The approximation subbands of the U and V planes become offsprings of the approximation subband of the Y-plane, and these offsprings are added to the list of offsprings of the Y-plane. As the same number of pixels lay in these approximation subbands from different color planes (one has performed one level of decomposition less in the U and V color planes than in the Y-plane), each Y-coefficient of the root subband has two additional offsprings coming from U and V root subband. Thus, for the 3D-SPIHT algorithm, instead of 8 offsprings as in the original algorithm, one has 10 offsprings for each coefficient in the Y-plane of the root subband. For the following decomposition levels, the same hierarchy of coefficients as in the original algorithm is kept. This is motivated by the fact that the relations of dependency are stronger inside the same color plane than between color planes. The embeddedness property is ensured, since the luminance and the chrominance components are processed in the same time for the same spatial position.

Figure 1:
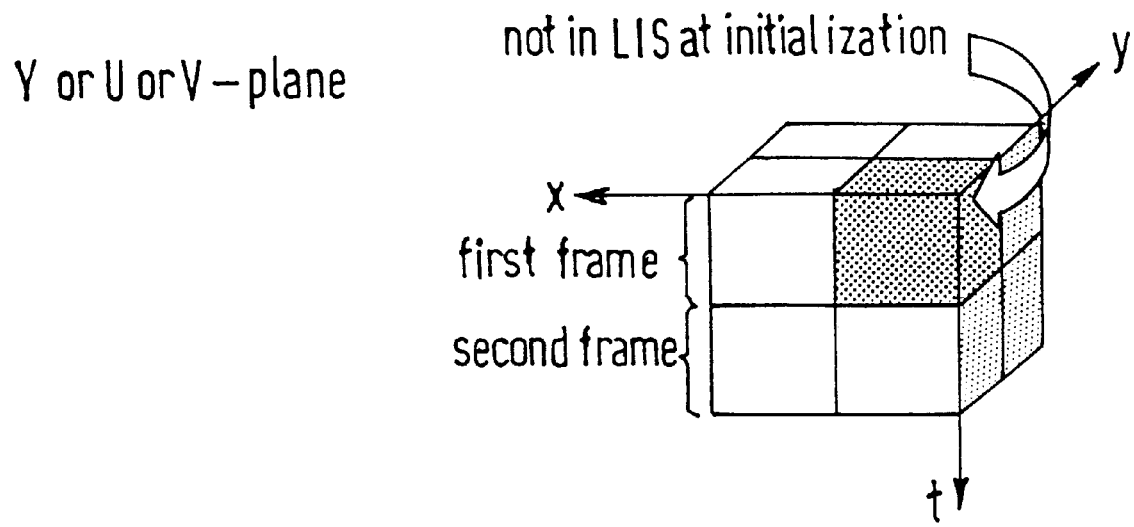
FIG. 1 shows a group of eight coefficients of the 3D decomposition, in the root subband of the original SPIHT algorithm (one over eight is not used to initialize the LIS)
Figure 2:
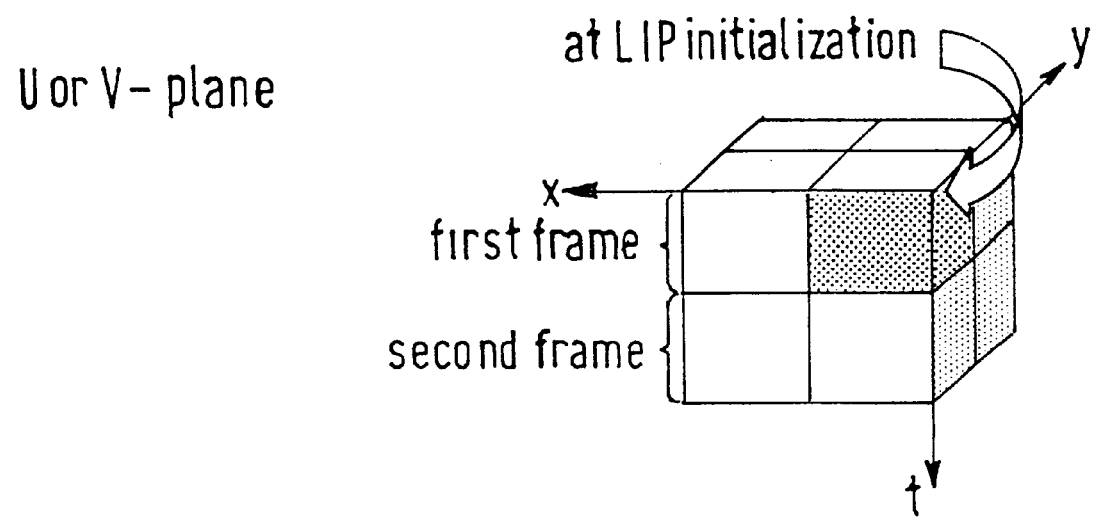
FIG. 2 illustrates—with respect to FIG. 1—the modification introduced according to the invention: the root coefficients not used for the initialization of the LIS are now used for the initialization of the LIP.

This modification is accompanied with a simplification in the structure of the initial lists of coefficients. Indeed, the original algorithm initializes the LIP and LIS with the appropriate coordinates of the top level in all the three planes. This means that the LIP is set with all the coefficients of the root subband from the three color planes, and the LIS is initialized with 7 pixels over 8 from the same spatio-temporal subband and from all color planes, as illustrated in FIG. 1 which shows a group of eight coefficients in the root subband of the original SPIHT algorithm (one over the eight coefficients is not used for the initialization of the LIS). With the present approach, it is only necessary to initialize these lists with the appropriate coordinates of the top level coefficients from the luminance plane: the chrominance coefficients of the U and V approximation subbands appear as offsprings of the luminance coefficients in the root subband. This also implies another modification: the root coefficients from the U and V color planes corresponding to the positions which are not considered for the initialization of the LIS must be used for the initialization of the LIP (see FIG. 2).

Figure 3:
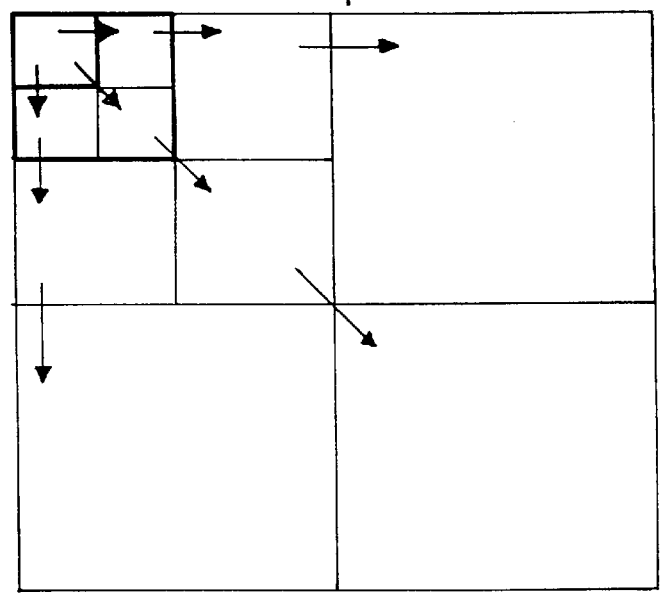
FIG. 3 shows the dependencies between the different subbands of the spatial decomposition in the original SPIHT algorithm (the arrows are indicating the parent-children relations)
Figure 3:
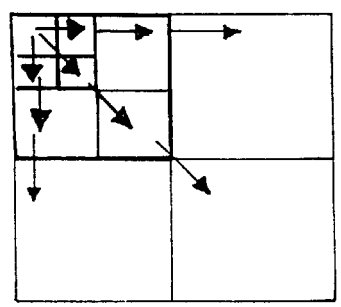
Figure 3:
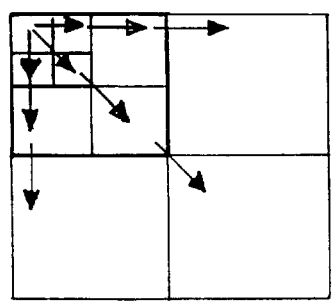
Figure 4:
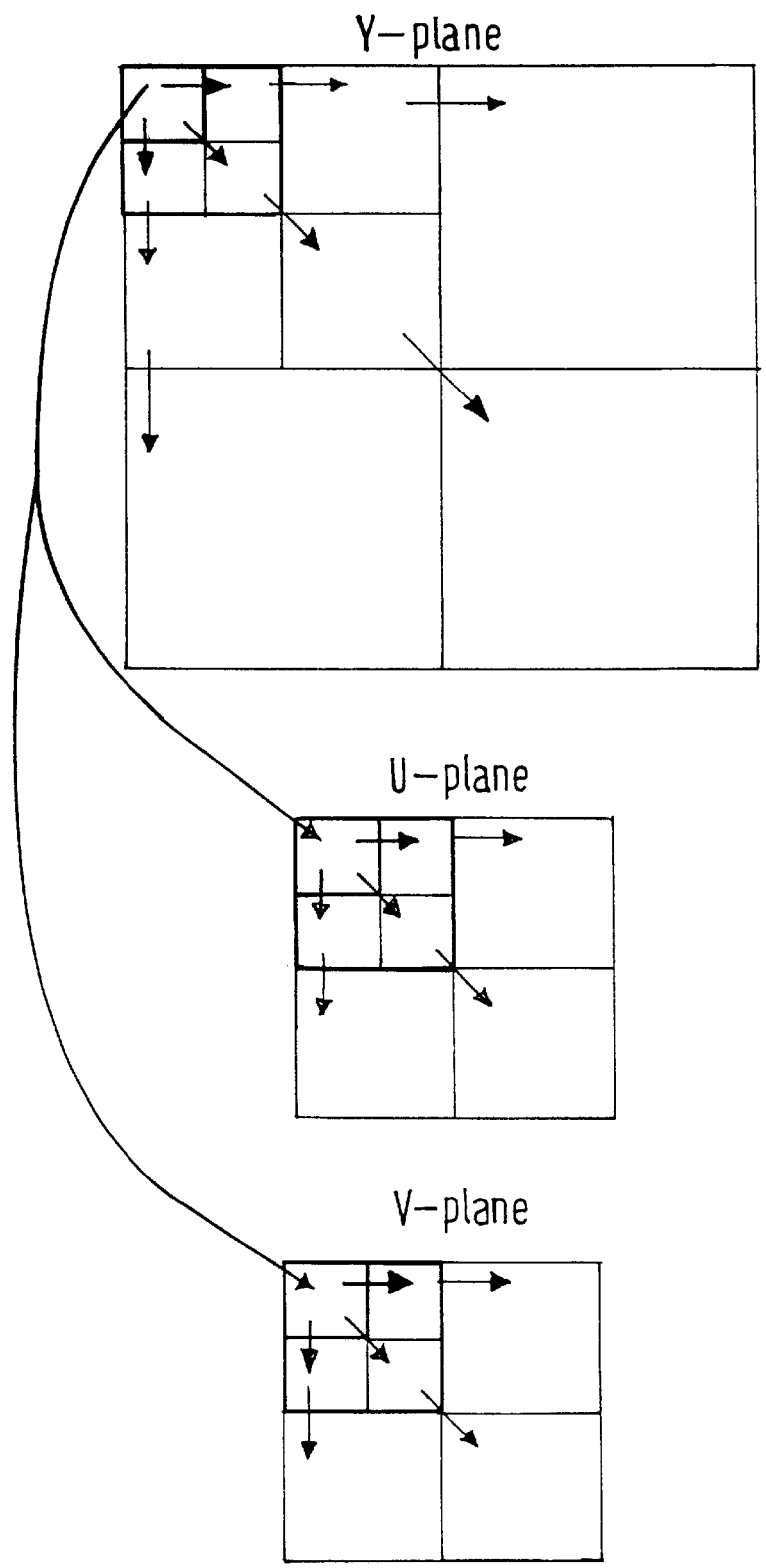
FIG. 4 illustrates—with respect to FIG. 3—the additional dependencies between color planes decompositions introduced according to the proposed method (the arrows are also indicating the parent-children relations).

The proposed technique, illustrated in the two-dimensional case for the sake of simplicity (the previous method being illustrated in FIG. 3, and the modifications introduced by the present method in FIG. 4), exploits the correlation existing between the luminance and the chrominance in video sequences by introducing a father-children relationship and dependence relations between the spatio-temporal trees of the three color planes. Its advantages are mainly:

the dependencies between luminance and chrominance components are exploited by the relations between spatio-temporal trees;

the U and V color planes are decomposed over a reduced number of resolution levels, thus the computational complexity of the algorithm decreases;

no extrapolation is needed and therefore no artificial coefficients are introduced (only real pixels are decomposed and coded), and no motion vector is computed and coded for each of these artificial pixels.

What is claimed is:

1. A color video coding method using a 3D-SPIHT algorithm applied in a tri-stimulus color space such as YUV with luminance plane Y and chrominance planes U and V being in the 4:2:0 format, wherein:

a wavelet decomposition of the U and V planes is performed over a number of resolution levels which is a number of resolution levels of the wavelet decomposition of the luminance plane minus one;

the U and V color planes being already in a sub-sampled format which allows to see the full resolution color U or V plane as an approximation of the full resolution luminance plane, the size of said full resolution color U or V plane is the same as the size of the first level approximation in the multiresolution decomposition of the Y plane and the n-th resolution level of the luminance has the same size as the (n−1)-th level of the chrominance;

each pixel (i,j) of the approximation sub-band at the lowest resolution of the Y plane is associated with the pixel at the same location in the corresponding sub-band of the U and V planes.

2. A method according to claim 1, in which the structure of the initial lists of the coefficients created by decomposing the original color image is simplified in that the initial lists are only initialized with the appropriate coordinates of the top level coefficients from the luminance plane, the chrominance coefficients of the U and V approximation sub-bands thus appearing as offsprings of the luminance coefficients in the root sub-band.

3. A method according to claim 2, in which the root coefficients from the U and V color planes corresponding to the positions which are not considered for the initialization of the list of insignificant sets are introduced in the list of insignificant pixels at initialization.

* * * * *